Sept. 21, 1965

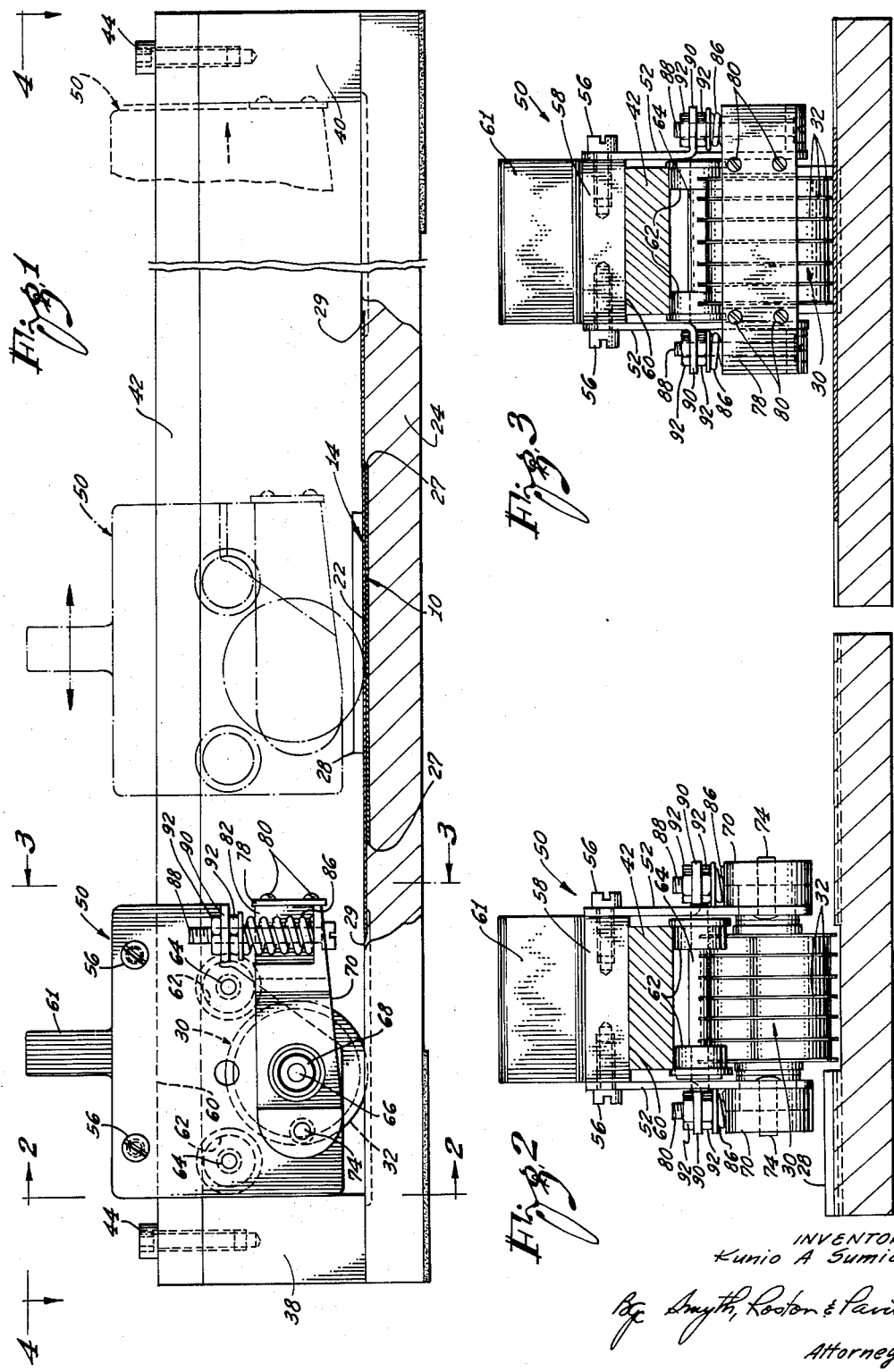

K. A. SUMIDA 3,207,069

APPARATUS AND METHODS OF RECORDING
USING PATTERNED CREDIT CARDS

Filed Nov. 15, 1961

INVENTOR:
Kunio A. Sumida

Attorneys

INVENTOR:
Kunio A. Sumida

Attorneys

United States Patent Office 3,207,069
Patented Sept. 21, 1965

1

3,207,069
APPARATUS AND METHODS OF RECORDING
USING PATTERNED CREDIT CARDS
Kunio A. Sumida, Los Angeles, Calif., assignor, by mesne
assignments, to Biagio F. Ambosio, Tarzana, Calif.
Filed Nov. 15, 1961, Ser. No. 152,423
11 Claims. (Cl. 101—269)

This invention relates to apparatus for recording information on tickets involving the sale of merchandise or services. Such tickets are then used by the accounting department of the organization selling the service or goods to provide a control over inventory or to provide a control over the billing of customers. The invention also relates to methods of recording information on such tickets.

In recent years, credit cards have become an important aspect of business life. Businessmen carry credit cards for gas stations, restaurants and department stores, as well as for a wide variety of other commercial enterprises. The credit cards used until now have generally been formed from plastic material and have been provided with a thin rectangular configuration. Information has generally been printed on the card in an embossed form. This embossed information has included the name and address of the person receiving the credit card from the organization issuing the credit card. The embossed information has also generally included a number indicating in coded form the identity of the person to whom the credit card has been issued.

The person carrying the credit card submits the credit card to a salesman at the time that he makes a purchase of goods or services. The salesman places a ticket on the credit card and disposes the ticket and the credit card in a machine which presses the ticket against the credit card. In this way, the embossed information on the credit card is recorded on the ticket. The salesman then writes information individual to the sale, such as the amount and classification of the goods or services purchased and the price of such goods or services.

The advantage of credit cards to the owner is that the owner does not have to carry as much cash as he would otherwise require. Furthermore, since each credit card has information in coded form individual to the person carrying the credit card, the organization selling goods or services to such person is able to keep a record on the ticket of the goods and services purchased by such person. The selling organization is then able to bill the person for the total amount of such goods and services purchased during each month. The credit card is also advantageous since tickets imprinted with the information on the credit card and with information individual to the goods or services purchased provide a permanent record as to the goods and services purchased by each individual during each month. In this way, the tickets are able to provide some control of inventory.

Although considerable work has been performed by a large number of different organizations to perfect credit cards in recent years, the credit cards now in use have certain inherent disadvantages. One important disadvantage has resulted from the embossing of information on the credit card to indicate the name and address and the identity in coded form of the person receiving the credit card. The embossing has provided weak spots in the credit card so that the credit card snaps and cracks after some usage. This has been especially troublesome because of the plastic material from which the credit card has been made.

Another difficulty in the use of embossing has been that the embossed information is recorded on the ticket as dark lines on a light background. This has been disadvantageous since the ticket tends to become smeared. Because of this, it has been difficult at times to distinguish between the recorded information and the smears. The difficulty has been common both to persons reading the information recorded on the ticket and machines processing such information.

The invention disclosed and claimed in this application overcomes the above disadvantages. For example, the invention disclosed and claimed in this application uses a credit card with holes or openings in the card in a pattern to provide information in alphanumeric and coded form as to the name and address of the person owning the card. This causes the credit card to become strengthened. It also causes the thickness of the card to become reduced in comparison to the thickness of the embossed cards now in use.

In addition to the use of credit cards with openings, the invention disclosed and claimed in this application uses tickets in which information is recorded at positions where pressure is applied to the ticket. The information recorded by the application of pressure may be in magnetic form so that it can be easily read and processed by magnetic transducers such as exist in data processing systems now in use. The information recorded on the tickets may also be optically scanned by optical transducers such as exist in data processing systems now in use.

In the methods constituting this invention the credit card is disposed on a flat bed such as the base portion of a guide member. The ticket is in turn disposed on the credit card. A roller with thin annular flanges is then rolled along the ticket so that the flanges are constantly pressed against the ticket. This causes lines to be recorded on the ticket with interruptions in the lines at positions corresponding to the positions of the holes in the credit card. Since the interruptions in the lines recorded on the card provide the information individual to each credit card, it will be seen that the information is represented by light interruptions in a dark line rather than by dark recordings on a white background as in the tickets of the prior art.

The apparatus constituting this invention includes a block which supports the annular roller. Means are supported by the block and are operatively coupled to the roller for causing the annular flanges of the roller to press constantly against the ticket during the movement of the roller along the ticket. Such means include a spring under constraint to bias the roller toward the ticket. Means are also provided for guiding the movement of the roller along the ticket. Such means include a guide bar and further include means in the block for engaging the guide bar at successive positions along the guide bar.

In the drawings:

FIGURE 1 is an elevational view of a guide member for supporting a credit card and a ticket and of apparatus movable along a base portion of the guide member to obtain a recording of information on the ticket in accordance with information previously provided on the credit card, such apparatus being shown in one position in solid lines and in a second position in broken lines and in a third position on a fragmentary basis in broken lines;

FIGURE 2 is a sectional view substantially on line 2—2 of FIGURE 1 and illustrates in further detail the guide member and the apparatus movable along the guide member to record information on the ticket in accordance with information previously provided on the credit card;

FIGURE 3 is a sectional view substantially on the line 3—3 of FIGURE 1;

Figure 8:
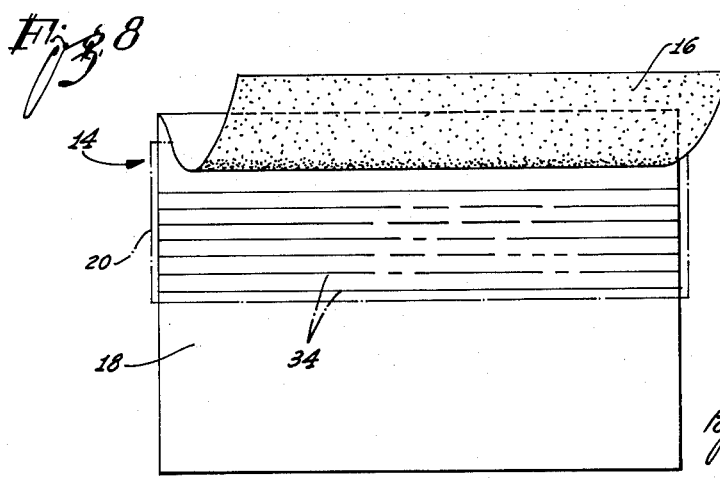
Figure 7:
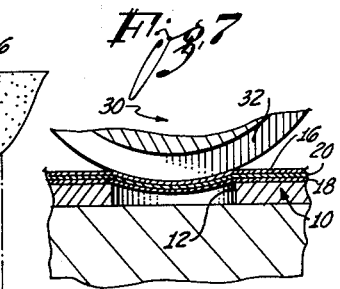

FIGURE 7 is an enlarged fragmentary sectional view illustrating in elevation the disposition of the roller relative to the ticket, the credit card and the base portion of the guide member when the roller is moving over a hole in the credit card; and FIGURE 8 is an enlarged schematic view, somewhat in perspective, of a ticket after information has been recorded on the ticket by the apparatus shown in the previous figures.

Figure 4:
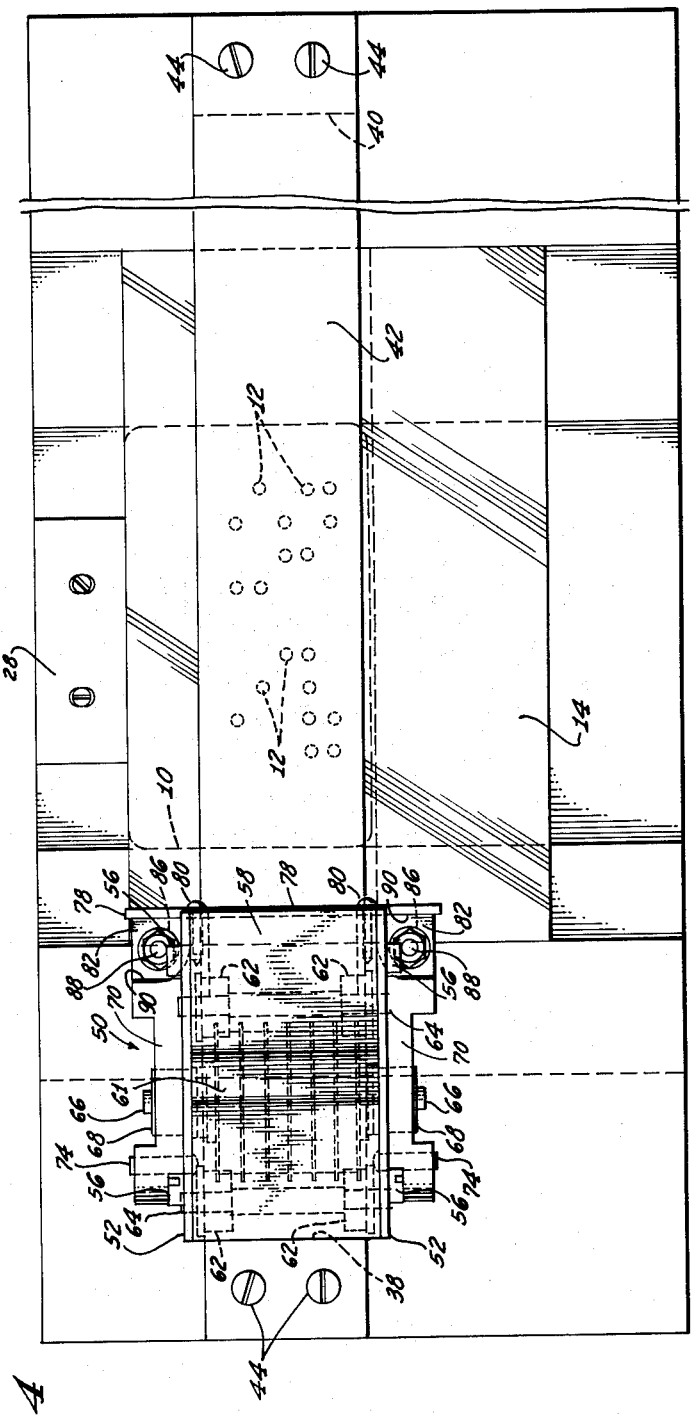
FIGURE 4 is a sectional view substantially on the line 4—4 of FIGURE 1.
Figure 5:
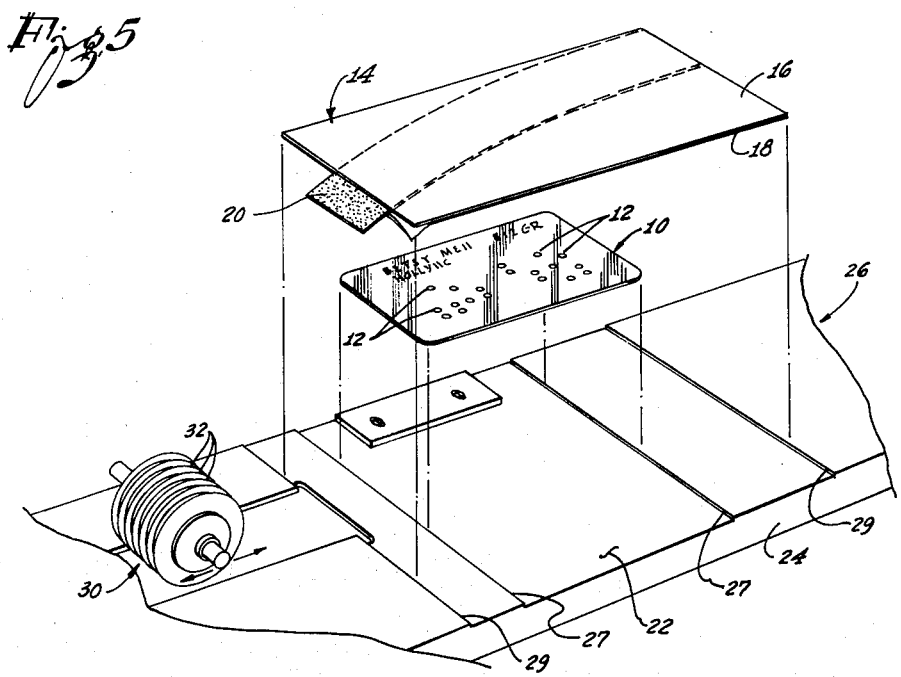
FIGURE 5 is a fragmentary schematic view on an exploded basis of the credit card, the ticket, the base portion of the guide member and a roller in the recording apparatus for obtaining the transfer of information on the credit card to the ticket.
Figure 6:
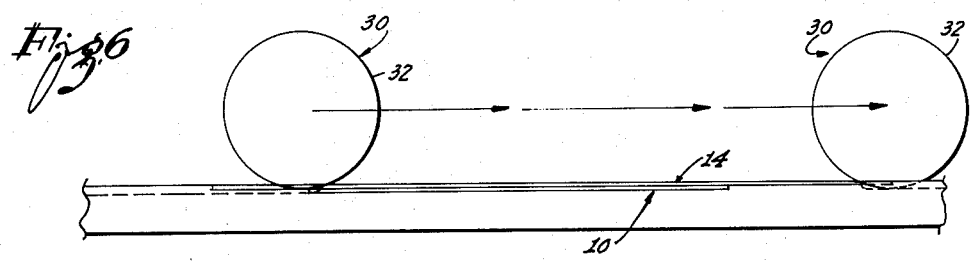
FIGURE 6 is a schematic view illustrating the movement of the roller on the base portion of the guide member over the ticket and the credit card.

The invention disclosed and claimed in this application uses a credit card or credit plate which is different from the credit cards or plates now in use. This credit card, generally indicated at 10 in FIGURE 5, is preferably formed from a plastic material such as a polyvinyl and is preferably provided with a flat rectangular configuration having a relatively narrow thickness. For example, the credit card may have a length of approximately 3¼", a width of approximately 2 1/16" and a thickness of less than 1/32". In these respects the credit card 10 is similar to the credit cards of the prior art.

The credit card 10 is provided with a plurality of openings 12 which have a pattern identifying in coded form certain information such as a number individual to the owner of the card. The holes 12 are disposed in rows extending along the length of the card. The pattern of the holes in the different rows provides the identifying information. Although the card 10 is illustrated as having holes which extend completely through the card, it will be appreciated that the openings 12 may actually extend only partially through the card.

The card 10 may also be provided with embossing to indicate the name and address of the owner of the card in normal alphanumeric letters and numbers. However, it will be appreciated that the embossing is only by way of example and that even the name and address of the owner of the card may be provided in the card in other forms as by small holes or openings corresponding to the openings 12. The embossing may either be on one face of the card in numbers and letters which are directly readable, or the embossing may be on the reverse face of the card in inverted form.

The credit card 10 is adapted to be used with a ticket, generally indicated at 14, so that information in the credit card can be transferred to the ticket. The ticket 14 is provided with a rectangular configuration having dimensions somewhat larger than the credit card 10 so that the ticket 14 can be placed upon the credit card 10 and fully cover the card. The ticket 14 is larger than the credit card 10 since information relating to the type and quantity of goods or services purchased and the price of such goods has to be recorded on the ticket by the seller in addition to the information from the credit card.

As ilustrated in FIGURE 8, the ticket is preferably formed from a top sheet 16 and from a bottom sheet 18 with a sheet of carbon paper 20 intermediate the sheets 16 and 18. In this way, the information recorded on the sheet 16 by pressure contact against the sheet can be also recorded on the sheet 18 by the transfer of the information through the carbon paper 20. One of the sheets 16 and 18 can be given to the purchaser after the proper information has been recorded on the card, and the other sheet can be retained by the seller for purposes of future billing and future inventory control. The top sheet 16 of the ticket 14 is coated with a material or is made from a material to provide a marking on the ticket at the positions where pressure is applied against the ticket. Preferably the markings formed on the ticket from the application of pressure against the ticket have magnetic characteristics. In this way the ticket can be disposed in data processing apparatus having magnetic transducers to obtain a reading of information by the magnetic transducers of the information recorded on the ticket 14 from the credit card 10 disposed below the ticket. It will be appreciated that the top sheet 16 of the ticket can also be coated with a material to provide a carbon recording or can be chemically coated to have a chemical reaction upon the application of pressure such that an individual color is produced at the positions of pressure.

The credit card 10 is adapted to be disposed in a flat bed 22 (FIGURE 5) of a base portion 24 which forms a part of a guide member generally indicated at 26. The bed 22 is defined by vertical grooves 27 in the base portion and may also be defined by a strip 28 disposed at one end of the guide member. The ticket 14 is in turn placed on the credit card 10 so as to partially or completely cover the card. The disposition of the ticket 14 on the bed 22 is further defined by grooves 29.

After the credit card 10 and the ticket 14 have been properly positioned on the bed 22, a roller 30 having one or more thin annular flanges 32 is then moved over the ticket 14 and is constantly pressed against the ticket during such movement. The annular flanges 32 may be provided with a thickness considerably less than 1/32" and may be provided with a depth of approximately 1/16".

As the roller 30 is moved over the ticket 14, the flanges 32 produce lines on the ticket 10 such as indicated at 34 in FIGURE 8. The lines 34 are interrupted at positions in each row corresponding to the positions of the openings 12 in the credit card 10 in that row. The production of the interruptions in the lines 34 may be seen from FIGURE 7, which illustrates how the ticket 14 becomes disposed in one of the openings 12 in the credit card 10 as one of the flanges 32 on the roller 30 moves over the hole. Since the ticket yields during the movement of the flange 32 over the opening 12 in FIGURE 7, a reduced pressure is applied by the flange 32. This prevents a line from being recorded at the position corresponding to the opening in the credit card.

The guide member 26 includes a pair of uprights 38 and 40 and a guide bar 42. The guide bar 42 is attached to the uprights 38 and 40 as by screws 44 and is disposed in spaced and substantially parallel relationship to the base portion 24 of the guide member 26. The guide bar 42 may be provided with a length of approximately 12", a width of approximately 1¼" and a thickness of approximately 3/8".

The roller 30 is supported by a block generally indicated at 50 in FIGURES 1 to 4, inclusive. The block 50 includes a pair of side plates 52 (FIGURES 2 and 3) which are connected as by screws 56 to a cover plate 58. The cover plate 58 is provided with a flat bottom surface 60 which is disposed above the guide bar 42 for sliding movement along the guide bar. The cover plate 58 is further provided with a handle portion 61 (FIGURE 1) to facilitate a manual movement of the block 50 along the guide bar. The movement of the block 50 along the guide bar is limited by the uprights 40 on the guide member 26, as illustrated by the position of the block 50 in solid lines at the left in FIGURE 1 and in broken lines at the right in FIGURE 1.

The sliding movement of the block 50 is facilitated by disposing a plurality of wheels 62 against the bottom surface of the guide bar 42. The wheels 62 are disposed on shafts 64 which are journalled in the side plates 52. The roller 30 is also disposed on a shaft 66 which extends through the side plates 52 into bearings 68 (FIGURE 4), the bearings being disposed in a pair of brackets 70. The disposition of the wheels 62 and the roller 32 is such that the bottom surface of the cover plate 58 is slightly raised from the upper surface of the guide bar 42 so that friction between the cover plate and the guide bar is minimized.

The brackets 70 are supported from the side plates 52 by pins 74. The brackets 70 are maintained in a fixed relationship to each other by an end plate 78 which is attached as by screws 80 to the ends of the brackets opposite to the pins 74. The brackets 70 are provided with sockets 82 so that helical springs 86 (FIGURE 1) can be disposed under constraint in the sockets. The springs 86 are disposed on studs 88 which extend through the brackets 70 and through flanges 90 on the side plates 52. The studs 88 are retained in fixed position by nuts 92 which screw on the threaded ends of the studs and rest against the flanges 90.

In order to move the roller 30 over the ticket 14, the handle 61 of the cover plate 58 is gripped and moved in a longitudinal direction. This movement can be obtained with relatively little effort because the wheels 62 roll on the bottom surface of the guide bar 24. As the roller 30 moves over the ticket 14, the flanges 32 on the roller are maintained in pressure contact with the ticket because of the action of the constrained springs 86 in pivoting the brackets 70 about the pins 74 as a fulcrum. Since the flanges 32 on the roller 30 are pressed against the ticket 14, the flanges produce the lines 34 on the ticket as the roller moves over the ticket. The lines 34 are interrupted only at the positions corresponding to the positions of the holes in the credit card 10.

As will be seen from the above discussion, the invention disclosed and claimed in this application has certain important advantages. By recording thin lines on the ticket 14, an imprint with a high definition is obtained. Furthermore, the recording of thin lines to represent the information in coded form allows the information to be recorded with greater density than in the cards now in use. Since the information is represented by the disposition of the interruptions in each line 34 at the positions of information, the information constitutes light matter on a dark background. This is opposite to the imprinting of dark matter on a light background as in the credit cards of the prior art. This minimizes the possibility of producing background noise on the card. A further advantage from the use of openings in the cards is that the cards are thinner and stronger than the cards of the prior art. These advantages are important to people who carry a number of different credit cards and use such cards constantly.

Although this application has been disclosed and illustrated with reference to particular applications, the principles involved are susceptible of numerous other applications which will be apparent to persons skilled in the art. The invention, is therefore, to be limited only as indicated by the scope of the appended claims.

What is claimed is:

1. In combination for use with a credit card having a plurality of openings in a pattern corresponding to information to be recorded on a ticket disposed in juxtaposition to the card, wherein the ticket is constructed to provide a record of the positions at which pressure is applied to the card, a member movable along the ticket and the credit card and provided with a sharply defined flange for engaging the ticket at successive positions to obtain a line record on the ticket of such successive positions and to obtain an interruption in such line record at positions corresponding to the positions of the openings in the credit card, and means operatively coupled to the movable member for guiding the movement of the member in a substantially uniform plane along the full length of the ticket in pressure contact with the ticket.

2. In combination for use with a credit card having a plurality of openings in a pattern corresponding to information to be recorded on a ticket disposed in juxtaposition to the card wherein the ticket is constructed to provide a record of the positions at which pressure is applied to the card, a member movable along the ticket and the credit card and provided with a sharply defined flange for engaging the ticket at successive positions to obtain a line record on the ticket of such successive positions and to obtain an interruption in such line record at positions corresponding to the positions of the openings in the credit card, means operatively coupled to the movable member for maintaining the movable member in pressure contact with the ticket along the full length of the ticket to provide a line record on the ticket of the positions engaged by the flange on the movable member, and means operatively coupled to the movable member for guiding the member for movement in a substantially uniform plane along the full length of the ticket to obtain the line record.

3. In combination for use with a credit card having a plurality of openings in a pattern corresponding to information to be recorded on a ticket disposed in juxtaposition to the plate wherein the ticket is constructed to provide a record of the positions at which pressure is applied to the card, a roller movable along the ticket and provided with a sharply defined annular flange for engaging the ticket during the movement of the roller along the ticket to obtain a recording of lines by the roller along the spaces between successive pairs of openings, a guide member disposed in spaced and substantially parallel relationship to the ticket along the full length of the ticket to guide the movement of the roller along the ticket.

support means supported by the guide member and supporting the roller for providing a controlled movement of the support means in a substantially uniform plane along the guide member and for guiding the movement of the roller in a substantially uniform plane along the full length of the ticket, and spring-biased means operatively coupled to the roller for maintaining the roller in pressure contact with the ticket during the movement of the roller along the full length of the ticket.

4. In combination for use with a credit card having a plurality of openings in a pattern corresponding to information to be recorded on a ticket disposed in juxtaposition to the card wherein te ticket is constructed to provide a record of the positions at which pressure is applied to the card, a roller movable along the ticket and provided with a sharply defined annular flange for engaging the ticket during the movement of the roller along the ticket to obtain the recording of a line by the flange and to obtain interruptions in the line at positions corresponding to the positions of the openings in the credit card, means including a guide bar disposed in a plane substantially parallel to that of the credit card and the ticket and in spaced relationship to the credit card and the ticket along the distance between the extremities of the credit card and operatively coupled to the roller for guiding the roller in a substantially uniform plane along the full length of the ticket, and means including a constrained spring operatively coupled to the roller for maintaining the flange on the roller against the ticket along the distance between the extremities of the credit card to obtain a recording of the line on the ticket during the movement of the roller along the ticket.

5. In combination for use with a credit card having a plurality of openings in a pattern corresponding to information to be recorded on a ticket disposed in juxtaposition to the card wherein the ticket is constructed to provide a record of the positions at which pressure is applied to the card, a block, a first roller movable along the ticket and supported by the block and provided with a plurality of annular flanges disposed in axially spaced relationship to one another and shaped to produce lines along the ticket with interruptions corresponding to the positions of the openings in the credit card, a guide member disposed in spaced and substantially parallel relationship to the ticket and having first and second opposed surfaces each disposed in a substantially uniform plane, the block being shaped to receive and retain the guide member for movement of the block along the first surface of the guide member as a guide for the block, means including a second roller supported by the block in engagement with the second surface of the guide member for facilitating the movement of the block along the guide member, and means including a spring supported by the block in a constrained relationship and operatively coupled to the first roller for maintaining the first roller in pressure contact with the ticket during the movement of the roller along the full length of the ticket to obtain a recording of lines by the flanges on the rollers.

6. The combination set forth in claim 5 in which the block is provided with a handle to facilitate the movement of the roller along the ticket.

7. In combination for use with a credit card having a plurality of openings in a pattern corresponding to information to be recorded on a ticket disposed in juxtaposition to the card wherein the ticket is constructed to provide a record of the positions at which pressure is applied to the card, a roller movable along the ticket and provided with a thin annular flange to engage the ticket and produce a recording of a line on the ticket with interruptions in the line at positions corresponding to the openings in the credit card, a guide member having a flat base portion for receiving the card and the ticket in juxtaposed relationship and having a bar in spaced and substantially parallel relationship to the base portion for guiding the movement of the roller along the base portion, a block supporting the roller between the guide bar and the base portion of the guide member and provided with a portion for receiving the bar on the guide member to maintain the block on the guide member in slidable relationship to the guide member and to provide for a sliding movement of the block along the bar on the guide member, and constrained means supported by the block in a constrained relationship and operatively coupled to the roller and to the block for maintaining the flange on the roller in pressure contact with the ticket and the credit card on the flat base portion of the block along the full length of the ticket.

8. The combination set forth in claim 7 in which the block supports at least a second roller in pressure contact with the guide bar on the guide member to facilitate the movement of the block along the guide member.

9. A method of recording information, including the steps of:

providing a flat credit card with a plurality of openings in a pattern corresponding to the information to be recorded, providing a ticket with properties of producing a permanent record of the positions at which pressure is applied to the ticket, disposing the credit card on a hard flat surface and disposing the ticket on the flat credit card, providing a roller with a thin annular flange, and moving the roller along the ticket with the flange on the roller in pressure contact with the ticket to obtain the recording of a line on the ticket with interruptions in the line at positions corresponding to the positions of the openings in the credit card.

10. A method of recording information, including the steps of:

providing a flat credit card with a plurality of openings in a plurality of spaced rows and in a pattern in each row corresponding to the information to be recorded, providing a ticket with properties of producing a permanent record of the positions at which pressure is applied to the ticket, disposing the credit card on a hard flat surface and disposing the ticket on the flat credit card, providing a roller with a plurality of thin annular flanges spaced at positions corresponding to the spacing between the rows of openings in the credit card, and moving the roller along the ticket with each annular flange on the roller moving along the openings in a different row to obtain the recording on the ticket of a plurality of rows of lines wherein the lines in each row are interrupted in a pattern corresponding to the pattern of openings in the credit card in that row.

11. The combination as set forth in claim 7 wherein the block supports a second roller and wherein the second roller engages the bar on the block and wherein the constrained means is operatively coupled to the second roller for maintaining the second roller in pressure contact against the bar on the block.

References Cited by the Examiner

UNITED STATES PATENTS

| | | | |
|---|---|---|---|
| 157,495 | 12/75 | Cone | 101—23 X |
| 978,500 | 12/10 | Spiegel | 101—128.4 X |
| 1,025,495 | 5/12 | Watkins | 101—426 X |
| 1,280,192 | 10/18 | Duncan | 101—56 |
| 1,813,390 | 7/31 | Dwyer | 101—32 X |
| 2,054,152 | 9/36 | Wood | 101—129 X |
| 2,975,282 | 3/61 | Schaffer | 101—369 X |
| 3,056,347 | 10/62 | Dashew et al. | 101—269 |

WILLIAM B. PENN, *Primary Examiner.*